United States Patent
Ishihara et al.

(10) Patent No.: US 8,049,445 B2
(45) Date of Patent: Nov. 1, 2011

(54) MOTOR CONTROLLER

(75) Inventors: Hidenori Ishihara, Hamamatsu (JP);
Hiroaki Yamamoto, Toyohashi (JP);
Nakatsune Shirai, Iwata (JP); Katsumi Endo, Kosai (JP); Tomoki Yamashita, Hamamatsu (JP)

(73) Assignee: Asmo Co., Ltd. (JP)

( * ) Notice: Subject to any disclaimer, the term of this patent is extended or adjusted under 35 U.S.C. 154(b) by 414 days.

(21) Appl. No.: 12/336,985

(22) Filed: Dec. 17, 2008

(65) Prior Publication Data
US 2009/0153090 A1   Jun. 18, 2009

(30) Foreign Application Priority Data

Dec. 18, 2007  (JP) .................................. 2007-326419
Sep. 17, 2008  (JP) .................................. 2008-238402

(51) Int. Cl.
*H02P 6/00*  (2006.01)

(52) U.S. Cl. ......... 318/400.01; 318/400.23; 318/400.26; 318/503

(58) Field of Classification Search ............. 318/400.01, 318/400.23, 400.26, 254.1, 599, 503
See application file for complete search history.

(56) References Cited

U.S. PATENT DOCUMENTS

| | | | |
|---|---|---|---|
| 3,638,093 A * | 1/1972 | Ross ............................. | 318/687 |
| 4,617,499 A * | 10/1986 | Yuasa ....................... | 318/400.01 |
| 6,433,507 B1 * | 8/2002 | Makaran et al. ............. | 318/811 |
| 6,448,729 B1 * | 9/2002 | Davies et al. ................. | 318/434 |
| 6,801,009 B2 * | 10/2004 | Makaran et al. ............. | 318/599 |
| 6,924,612 B2 * | 8/2005 | Ramirez et al. ............. | 318/280 |
| 7,202,622 B2 * | 4/2007 | Eskritt et al. ............. | 318/400.24 |

FOREIGN PATENT DOCUMENTS

JP         2007001366 A       1/2007

* cited by examiner

*Primary Examiner* — Walter Benson
*Assistant Examiner* — Thai Dinh
(74) *Attorney, Agent, or Firm* — Caesar, Rivise, Bernstein, Cohen & Pokotilow, Ltd.

(57) ABSTRACT

A motor controller that outputs a drive signal to a direct-current motor to drive the motor is provided. The motor controller includes a drive circuit that generates the drive signal. The drive circuit superimposes on a direct-current voltage an alternating-current component having a frequency in the audible frequency range of the human ear, thereby generating the drive signal.

6 Claims, 1 Drawing Sheet

MOTOR CONTROLLER

FIELD OF THE INVENTION

The present invention relates to a motor controller that is suitable for improving the sound quality of operating noise of a Direct-current motor.

BACKGROUND OF THE INVENTION

Conventionally, noise reduction of motors has been attempted, for example, by reducing the operating noise of motors or shifting such operating noise out of the audible frequency range. Generally, motors are designed in an optimal manner to reduce noise by selecting the materials and shapes of components that affect the resonant frequencies of the components and the number of poles of the motor. However, it is difficult and troublesome to reduce noise of motors by optimizing only the mechanical features of the components.

For example, Japanese Laid-Open Patent Publication No. 2007-1366 discloses a technology for reducing the operating noise of a motor through electric control, namely, by adjusting the direct-current voltage supplied to the motor.

Including the technology disclosed in Japanese Laid-Open Patent Publication No. 2007-1366, technologies for reducing motor operating noise have been widely known. In contrast, the present inventors are considering improving the sound quality of motor operating noise by adjusting the tone of motor operating noise, instead of attempting to reduce the operating noise. Although electric control is an easy and preferable way to improve the sound quality of motor operating noise, more consideration is needed on what kind of control would be the most appropriate.

SUMMARY OF THE INVENTION

Accordingly, it is an objective of the present invention to provide a motor controller that allows the sound quality of motor operating noise to be easily improved.

To achieve the foregoing objective and in accordance with a first aspect of the present invention, a motor controller that outputs a drive signal to a direct-current motor to drive the motor is provided. The motor controller includes a drive signal generating section that generates the drive signal. The drive signal generating section generates the drive signal by superimposing on a direct-current voltage an alternating-current component having a frequency in the audible frequency range of the human ear.

In accordance with a second aspect of the present invention, a method for controlling a direct-current motor is provided. The method includes generating a drive signal that is output to a direct-current motor to drive the motor. The drive signal is generated by superimposing on a direct-current voltage an alternating-current component having a frequency in the audible frequency range to the human ear.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIG. 1 and FIG. 2.

Figure 1:
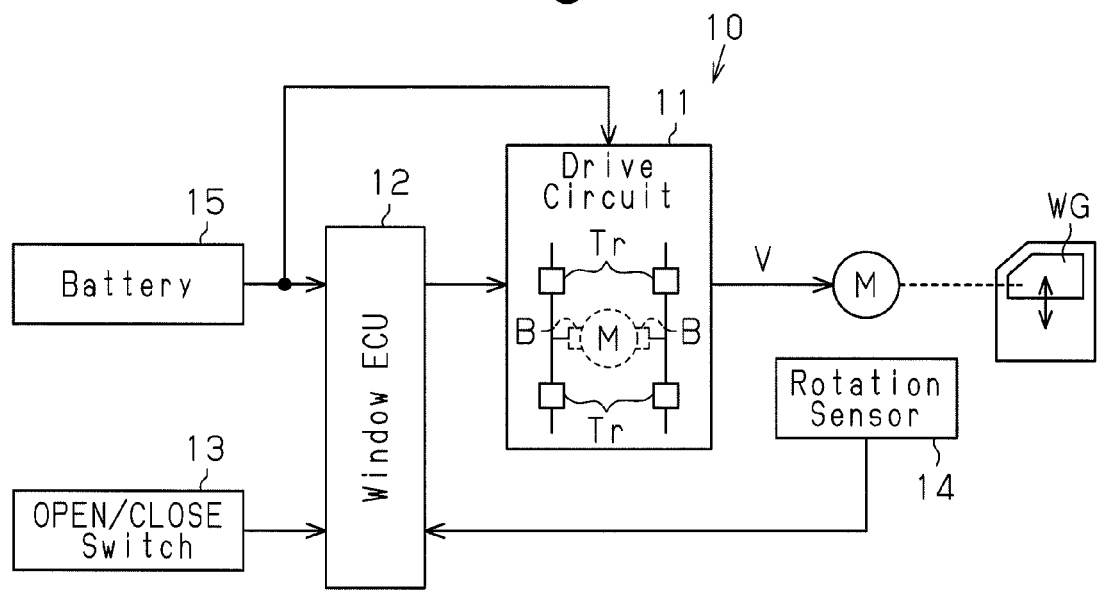
FIG. 1 is an electric block diagram showing a motor controller according to one embodiment of the present invention.
Figure 2:
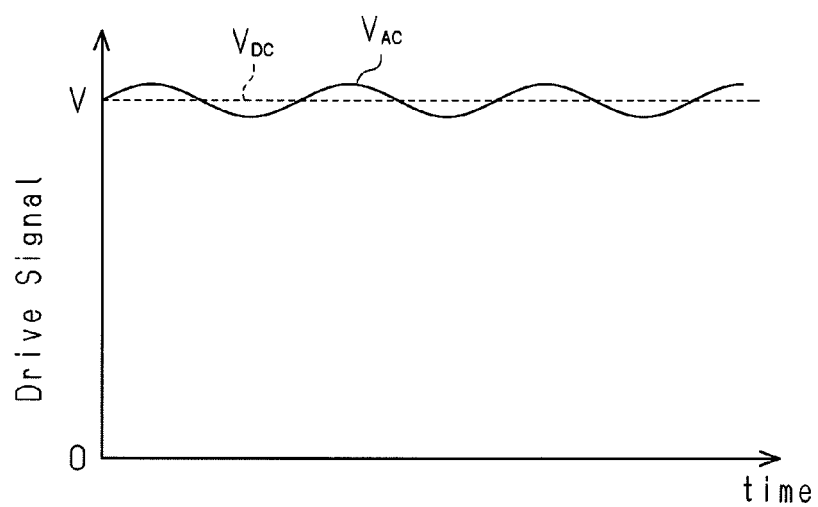
FIG. 2 is a waveform chart of a drive signal supplied to the motor shown in FIG. 1.

As shown in FIG. 1, a motor controller 10 according to one embodiment of the present invention controls a motor M that drives a power window system mounted on a vehicle. The motor M is a direct-current brush motor with power supply brushes B. The controller 10 includes a drive circuit 11 that generates a drive signal (drive voltage) for driving the motor M and a window ECU 12 for controlling the drive circuit 11. Based on an OPEN/CLOSE signal from an OPEN/CLOSE switch 13, the window ECU 12 causes the motor M to rotate in a forward direction or a reverse direction through the drive circuit 11, thereby opening or closing a window glass WG. Based on a rotation detection signal supplied by a rotation sensor 14, the window ECU 12 detects the rotation direction and rotation speed of the motor M, and reflects the detection results on the control of the motor M.

The drive circuit 11, which serves as a drive signal generating section, has an H bridge circuit including a plurality of switching elements Tr. To cause the motor M to rotate in the forward or reverse direction, the switching elements Tr are turned on or off based on a control signal from the window ECU 12 serving as a control section. Based on turning on and off of the switching elements Tr, the drive circuit 11 generates the drive signal V using a direct-current voltage $V_{DC}$ (see FIG. 2) supplied by a battery 15, and supplies the drive signal V to the motor M.

The window ECU 12 of the present embodiment performs PWM control for each switching element Tr. The window ECU 12 periodically changes the duty cycle of the PWM control while maintaining the carrier frequency at a constant value. As shown in FIG. 2, the drive circuit 11 generates the drive signal V by superimposing an alternating-current component $V_{AC}$ having an amplitude of 2 [V] and a single frequency on the direct-current voltage $V_{DC}$ of 12 [V]. The frequency of the alternating-current component $V_{AC}$ is from 100 [Hz] to 3 [kHz].

Although the rotation speed of the motor M is slightly changed because of the alternating-current component $V_{AC}$ in the drive signal V, the sensible speed of opening and closing of the window glass WG is constant. Torque fluctuation of a single frequency is generated in the motor M. The frequency of the torque fluctuation is substantially the same as the frequency of the alternating-current component $V_{AC}$ superimposed on the direct-current voltage $V_{DC}$. The torque fluctuation generates vibration and operating noise. The operating noise of the motor M caused by the alternating-current component $V_{AC}$ is relatively accentuated compared to operating noises caused by factors other than the alternating-current component $V_{AC}$. The frequency of the alternating-current component $V_{AC}$, that is, the frequency of the operating noise of the motor M is from 100 [Hz] to 3 [kHz] in the audible frequency range (approximately from 20 [Hz] to 20 [kHz]) and is not uncommon to listen to. In the present embodiment, the frequency of the alternating-current component $V_{AC}$, which affects the sound quality, or the tone, of the operating noise, is set in advance, in the range from 100 [Hz]

to 3 [kHz] improving the operating noise, to a frequency of a tone that matches the operation of the window glass.

The present embodiment has the following advantages.

(1) In the present embodiment, the alternating-current component $V_{AC}$ having a frequency in the audible frequency range of the human ear is superimposed on the direct-current voltage $V_{DC}$ to generate the drive signal V, which is in turn supplied to the Direct-current motor M. The alternating-current component $V_{AC}$ generates torque fluctuation in the motor M, so that an operating noise of a frequency that is substantially the same as that of the alternating-current component $V_{AC}$ is generated in the motor M. This operating noise is relatively highlighted among operating noises caused by factors other than the alternating-current component $V_{AC}$. That is, since the frequency of the operating noise of the motor M is in the audible frequency range, the sound quality of the operating noise can be easily improved by adjusting its frequency. Accordingly, the present embodiment improves the motor operating noise accompanying the opening and closing of the window glass WG. Also, depending on the type of the vehicle, the operating noise of the motor M can be adjusted to sound upscale or brisk.

(2) In the present embodiment, the duty cycle of the PWM control performed on the switching elements Tr is periodically changed, so that the drive signal V is generated by superimposing the alternating-current component $V_{AC}$ having a predetermined frequency on the direct-current voltage $V_{DC}$. Therefore, the drive signal V, on which the alternating-current component $V_{AC}$ having a predetermined frequency is superimposed, is generated by simply changing the duty cycle of the PWM control periodically.

(3) In the present embodiment, the alternating-current component $V_{AC}$ has a frequency particularly in the range from 100 [Hz] to 3 [kHz] in the audible range of the human ear. Since the operating noise of the motor M is a sound of a frequency in the frequency range from 100 [Hz] to 3 [kHz], which is not uncomfortable to listen to. Accordingly, the tone of the operating noise is improved.

The above embodiment of the present invention may be modified as follows.

In the above embodiment, the alternating-current component $V_{AC}$ is generated by periodically changing the duty cycle with a constant carrier frequency of the PWM control. However, the alternating-current component $V_{AC}$ may be generated by periodically changing the carrier frequency with a constant duty cycle. Also, the alternating-current component $V_{AC}$ can be easily generated by causing the window ECU 12 to periodically change the on-state resistance of the switching element Tr. Other than the switching elements Tr, means for generating an AC signal may be provided.

In the above embodiment, the frequency of the alternating-current component $V_{AC}$ has a single value, and therefore, the tone, or the frequency of the operating noise of the motor M has a single value. However, an alternating-current component $V_{AC}$ having two or more frequencies may be superimposed on the direct-current voltage $V_{DC}$. The operating noise of the motor M is, in this case, a tone having a plurality of frequency components. Also, the frequency of the alternating-current component $V_{AC}$ may be changed in accordance with the position of the window glass WG, so that the operating noise of the motor M is changed in accordance with the position of the window glass WG. In the above embodiment, the frequency of the alternating-current component $V_{AC}$ is from 100 [Hz] to 3 [kHz]. However, as long as it is in the audible frequency range of the human ear (20 [Hz] to 20 [kHz]), the alternating-current component $V_{AC}$ may have any frequency.

In the above embodiment, the opening-closing speed of the window glass WG is controlled to be substantially constant. However, the opening-closing speed of the window glass WG may be changed in accordance with its position.

In the above embodiment, the controlled object is the motor M, which is used for opening and closing the window glass WG. However, the present invention may be used to control any motor that actuates an opening and closing body of a vehicle. The controlled object may be other type of motor.

In the above embodiment, the controlled object is the direct-current brush motor M with the power supply brushes B. However, the controlled object may be other type of motor such as a brushless motor.

What is claimed is:

1. A motor controller that outputs a drive signal to a direct-current motor to drive the motor, the direct-current motor actuating an opening and closing body provided in a vehicle, the motor controller comprising:
   a drive signal generating section that generates the drive signal, wherein the drive signal generating section generates the drive signal by superimposing on a direct-current voltage an alternating-current component having a frequency in the audible frequency range of the human ear, the frequency of the alternating-current component being changed in accordance with the position of the opening and closing body.

2. The motor controller according to claim 1, wherein the drive signal generating section includes at least one switching element, wherein the motor controller further comprising a control section that performs PWM control for the switching element, and wherein the control section changes duty cycle or carrier frequency in the PWM control, so that the drive signal generating section generates the drive signal having the alternating-current component.

3. The motor controller according to claim 1, wherein the drive signal generating section includes at least one switching element, wherein the motor controller further comprising a control section that controls the switching element, and wherein the control section changes the on-state resistance of the switching element, so that the drive signal generating section generates the drive signal having the alternating-current component.

4. The motor control according to claim 1, wherein the frequency of the alternating-current component is from 100 [Hz] to 3 [kHz].

5. The motor controller according to claim 1, wherein the direct-current motor is a direct-current brush motor.

6. A method for controlling a direct-current motor that actuates an opening and closing body provided in a vehicle, comprising:
   generating a drive signal that is output to a direct-current motor to drive the motor, wherein the drive signal is generated by superimposing on a direct-current voltage an alternating-current component having a frequency in the audible frequency range to the human ear; and
   changing the frequency of the alternating-current component in accordance with the position of the opening and closing body.

* * * * *